(12) United States Patent
Small et al.

(10) Patent No.: US 7,577,238 B2
(45) Date of Patent: Aug. 18, 2009

(54) OMNITESTER

(75) Inventors: David Benjamin Small, Dublin, CA (US); Steven M. Wollmershauser, San Antonio, TX (US); Yolius Diroo, San Antonio, TX (US); Jorey M. Pascasio, Jr., San Antonio, TX (US); Keith Joseph Allen, Austin, TX (US)

(73) Assignee: AT&T Intellectual Property I, L.P., Reno, NV (US)

( * ) Notice: Subject to any disclaimer, the term of this patent is extended or adjusted under 35 U.S.C. 154(b) by 904 days.

(21) Appl. No.: 11/095,940

(22) Filed: Mar. 31, 2005

(65) Prior Publication Data
US 2006/0227941 A1    Oct. 12, 2006

(51) Int. Cl.
*H04M 1/24* (2006.01)
*H04M 3/08* (2006.01)
*H04M 3/22* (2006.01)

(52) U.S. Cl. .................. 379/21; 379/24; 455/67.11; 455/67.7; 455/115.4

(58) Field of Classification Search ............ 379/22, 379/1.01, 1.03, 21, 23, 24; 324/110, 115; 455/63.1, 67.11, 67.13, 67.7, 115.3, 115.4, 455/504
See application file for complete search history.

(56) References Cited

U.S. PATENT DOCUMENTS

| | | | | |
|---|---|---|---|---|
| 1,722,539 | A * | 7/1929 | Ostline et al. | 379/33 |
| 2,046,450 | A * | 7/1936 | Fausett | 324/115 |
| 3,965,418 | A * | 6/1976 | Bauer et al. | 324/99 D |
| 5,572,117 | A * | 11/1996 | Yoon | 324/115 |
| 5,615,225 | A * | 3/1997 | Foster et al. | 379/29.01 |
| 5,923,161 | A * | 7/1999 | Frankovitch et al. | 324/115 |
| 6,078,251 | A * | 6/2000 | Landt et al. | 340/10.41 |
| 7,126,325 | B2 * | 10/2006 | Zhang | 324/110 |
| 7,225,064 | B2 * | 5/2007 | Fudali et al. | 701/29 |
| 2003/0174813 | A1* | 9/2003 | Mohammadian et al. | 379/22 |
| 2005/0144645 | A1* | 6/2005 | Casey et al. | 725/95 |

* cited by examiner

*Primary Examiner*—Binh K Tieu
(74) *Attorney, Agent, or Firm*—Toler Law Group

(57) ABSTRACT

A simplified field testing tool integrates signal-strength and error-rate testing for a variety of networking technologies prevalent for home networking, including but not limited to Multimedia over Coax (or applicable coax standard), Home-PNA 2, VDSL, 100BaseT Ethernet, 802.11 Wi-Fi, and analog/coaxial RF signals.

20 Claims, 2 Drawing Sheets

OMNITESTER

FIELD OF THE INVENTION

The invention relates to electronic signal detectors, and in particular to an OmniTester that selectively tests telecommunications signals from a plurality of inputs.

BACKGROUND OF THE INVENTION

In telecommunications networks, Customer Premises (or Provided) Equipment (CPE) includes a terminal and associated equipment and inside wiring located at a subscriber's premises and connected to a carrier's communication channel(s) at the demarcation point ("demarc"). The demarc is a point established in a building or complex to separate customer equipment from telephone company equipment. Excluded from CPE are over-voltage protection equipment and pay telephones in accordance with Federal Standard 1037C.

The demarcation point varies depending on the building type and service level. At a typical residential house, for instance, the demarcation point is a box normally mounted on the outside wall (in recent years, as close to the electrical ground as possible). Apartments and businesses having multiple lines typically have a 'punch down block' in an equipment room. More recently, a demarcation point may consist of either the first jack serviced or a special jack designed to function as a demarcation point in the premises. The special jacks often resemble jacks made to connect wall mounted telephones, but with a short cord looped at the bottom to a separate plug. Unplugging that loop isolates the rest of the residence.

Changes in phone repair services now place the responsibility of repair and maintenance beyond the demarcation point in the hands of the customer. Most residential and some large scale units now have a jack which allows the customer to disconnect their inside wires and check to see if their service is working properly from that point on.

There is a need, accordingly, for tool to allow a customer or a service technician to test all the various inputs that a subscriber may have. Currently, separate tools for testing each of the networking technologies are required. Furthermore, the separate tools typically incorporate detailed analysis, such as packet sniffers, at additional cost. The present invention, in contrast, provides technicians a single, inexpensive, simple tool to test each of the home data communications networking technologies they are likely to run into on a job.

BRIEF DESCRIPTION OF THE DRAWINGS

The present invention is further described in the detailed description that follows, by reference to the noted drawings, by way of non-limiting examples of embodiments of the present invention, in which reference numerals represent the same parts throughout the several views of the drawings, and in which.

DETAILED DESCRIPTION OF THE INVENTION

In view of the foregoing, the present invention, through one or more of its various aspects, embodiments and/or specific features or sub-components, is thus intended to bring out one or more of the advantages that will be evident from the description. The present invention is described with frequent reference to telecommunications detectors. It is understood, however, that telecommunications is merely an example of a specific embodiment of the present invention, which is directed broadly to signal detectors within the scope of the invention. The terminology, examples, drawings and embodiments, therefore, are not intended to limit the scope of the invention.

Expensive analysis test equipment is available that does not integrate all of the networking technologies a technician expects to encounter on a job. The test tool of the present invention, however, provides the technician one tool to troubleshoot a variety of problems instead of having multiple test tools. Accordingly, the present invention offers the advantages of relatively low cost and improved convenience.

The present invention incorporates multiple technologies into a single tool, and simplifies the information gathered. The tool enables rapid technician training in the field. Color coded jacks and LED's make the tool very easy to use.

A simplified field testing tool of the present invention integrates signal-strength and error-rate testing for a variety of networking technologies prevalent for home networking, including but not limited to Multimedia over Coax (or applicable coax standard), HomePNA 2, VDSL, 100BaseT Ethernet, 802.11 Wi-Fi, and analog/coaxial RF signals. Electronic components, circuitry and wiring conventions and standards, and the means for configuring the electronics of a device of the present invention to detect various signals are well known to those skilled in the art. Specific embodiments are battery powered. Alternative embodiments provide re-chargeable power, and, in certain embodiments, the signal source itself powers the unit. Even solar powered devices are contemplated.

Figure 1:
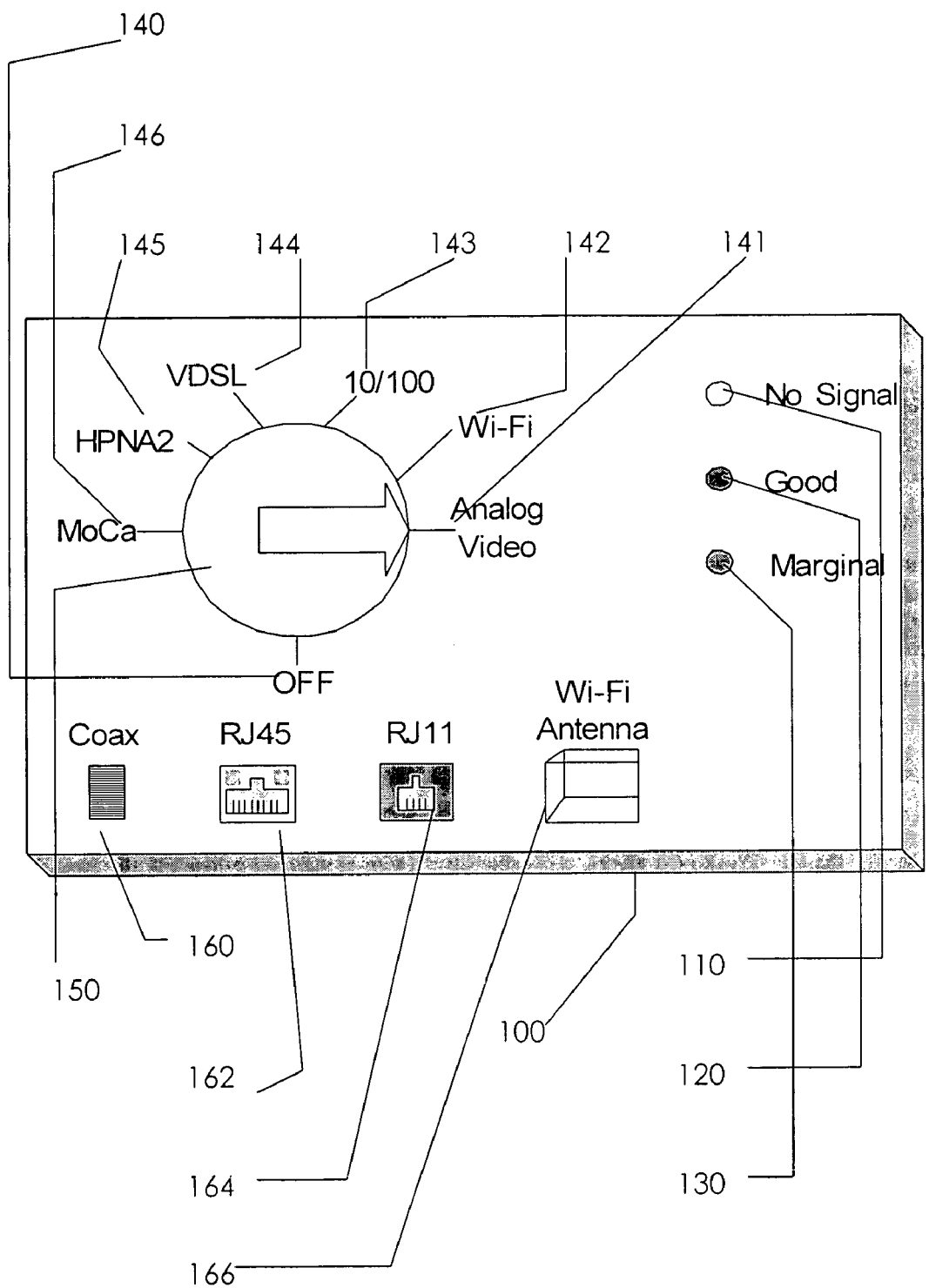
FIG. 1 is an isometric view schematic drawing of an OmniTester of a specific embodiment of the present invention.

FIG. 1 is an isometric view schematic drawing of an OmniTester of a specific embodiment of the present invention. A "low end" tool 100 of the invention uses colored LED's 110, 120 and 130 to indicate whether the signal strength or error-rate's are within specified ranges. Yellow LED 110 indicates No signal, green LED 120 indicates a good signal and red LED 130 indicates a marginal signal.

Device 100 may be selectively turned off at position OFF 140 with selector 150. Among the signals that can be selected for testing with selector 150 are analog video 141, Wi-Fi 142, Ethernet Base T 10/100 142, xDSL 144 (xDSL optionally includes VDSL), Home phone Networking Alliance HPNA2 145, Multimedia Over Coax MoCa 146. Device 100 further provides testing ports for coax 160, Ethernet LAN RJ45 162, telephone registered jack RJ11 164, and Wi-Fi antenna 166.

Selector 150 is depicted as a dial selector, but it will be evident to those skilled in the art that any suitable switch, including buttons, touch-pads, slide selectors, and so forth, may be adapted for use with the present invention.

Figure 2:
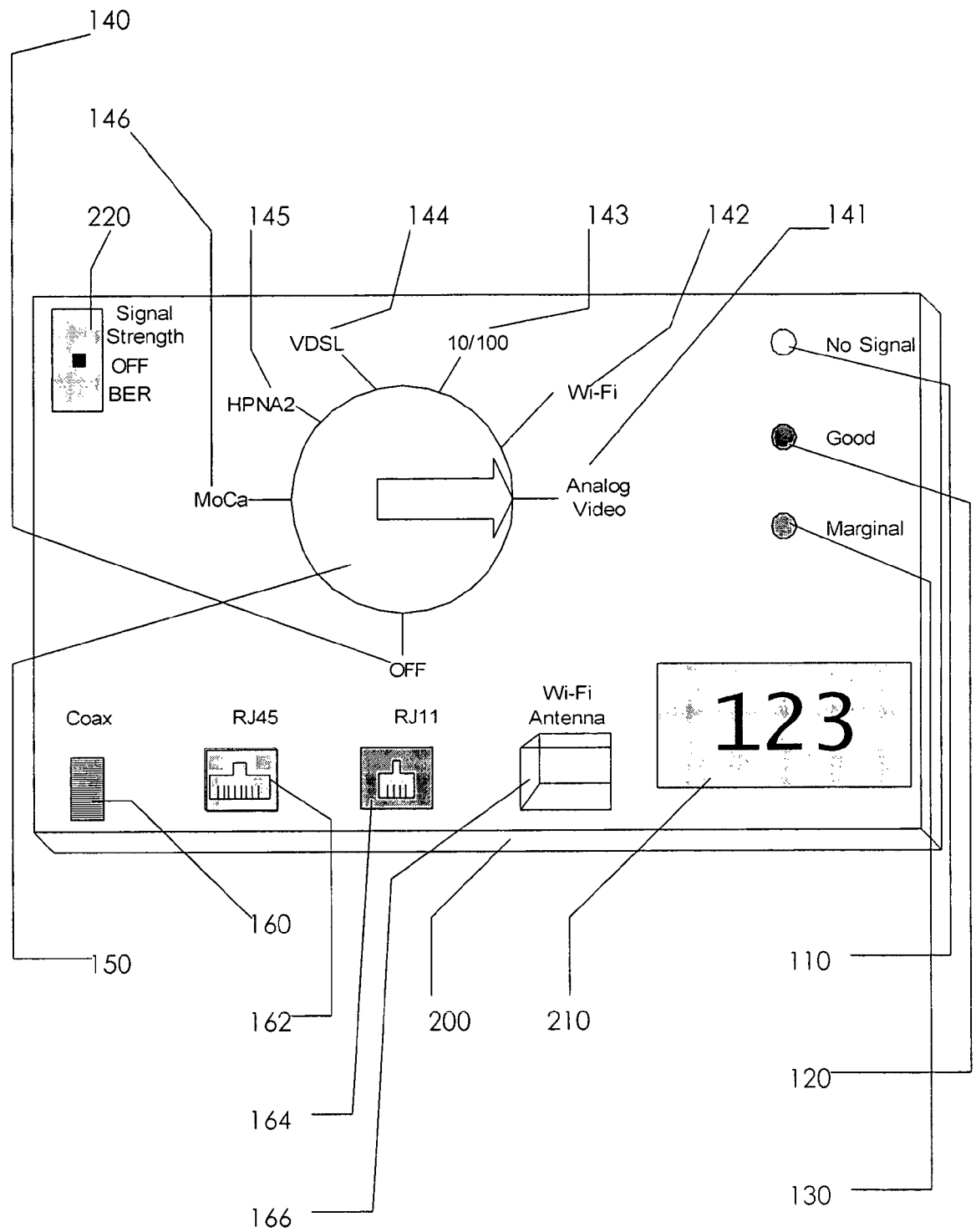
FIG. 2 is an isometric view schematic drawing of an alternative embodiment of an OmniTester of the present invention.

FIG. 2 is an isometric view schematic drawing of an alternative embodiment of an OmniTester of the present invention. A more sophisticated device 200 of the present invention provides digital display 210 to indicate the actual numeric signal reading, rather than whether the signal is in a specified range. Mode selector 220 provides the capability to toggle between reading strength of signal or BER/noise ratios. Bit Error Ratio (BER) is the ratio of the number of incorrect bits transmitted to the total number of bits.

In operation, a selected input such as coax, Ethernet, or telephone device 100 or 200 is jacked into the corresponding port of device 100 or 200. The signal to be detected is selected with selector 150. For example, analog video and MoCa signal sources both come through coax, so after hooking up a coax line to coax port 160, select analog video signal 141 and take a reading from indicators 110, 120, and 130, or from digital display 210 in the case of device 200. MoCa signal 146 then may also be selected with selector 150 and a MoCa reading is similarly taken. Note that device 100 or 200 provides an integral Wi-Fi antenna so that Wi-Fi signal readings may be made by selecting Wi-Fi with selector 150 to detect the presence or absence of a Wi-Fi signal as described above.

Additionally, switch 220 of specific embodiments provides the extra feature that a user can select a mode for signal detection. For example, a telephone line may be tested for BER/noise ratio by selecting the correct mode with selector 220, and select the signal strength detection mode with switch 220 to test the signal strength of a cable TV coax.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in all its aspects. Although the invention has been described with reference to particular means, materials and embodiments, the invention is not intended to be limited to the particulars disclosed; rather, the invention extends to all functionally equivalent technologies, structures, methods and uses such as are within the scope of the appended claims.

We claim:

1. A signal detector to measure telecommunications signals, the signal detector comprising:
   a housing holding electronics to measure a signal associated with a telecommunications protocol and to determine whether the measured signal is within a predetermined range associated with the telecommunications protocol, wherein the signal comprises one of a multimedia over coax (MoCa) signal, an analog radio frequency (RF) signal, a home phoneline networking alliance (HPNA) signal, a digital subscriber line (xDSL) signal, an Ethernet signal, and a Wi-Fi signal;
   a power source to power the electronics;
   at least one port on the housing to connect to the signal detector a media coupled to a signal source, wherein the media comprise coaxial cable media, Ethernet cable media, and telephone cable media;
   a source selector connected to the signal detector to select a signal for measurement from the at least one port; and
   an indicator mounted on the housing to indicate whether the measured signal of the signal source is within the predetermined range associated with the telecommunications protocol.

2. The signal detector of claim 1, further comprising an integral Wi-Fi antenna to wirelessly measure the Wi-Fi signal.

3. The detector of claim 1, wherein the indicator is operable to indicate that the measured signal of the signal source is within the predetermined range associated with the telecommunications protocol by measuring a signal strength of the selected signal and comparing the measured signal strength to a predetermined range associated with the telecommunications protocol.

4. The signal detector of claim 1, wherein the detector measures a bit error rate (BER) to noise (BER/noise) ratio of the selected signal.

5. The signal detector of claim 1, further comprising a mode selector to select a detection mode from among a signal strength detection mode and a BER/noise ratio detection mode.

6. The signal detector of claim 1, wherein the indicator comprises a numeric display to display a numeric value corresponding to a strength of the measured signal.

7. The signal detector of claim 1, wherein the indicator comprises a light emitting diode (LED) that illuminates when a detected signal is within the predetermined range associated with the telecommunications protocol.

8. The signal detector of claim 1, wherein the indicator comprises both a numeric display to display a numeric value corresponding to the measured signal strength of a detected signal and an LED that indicates when the measured signal strength is within the predetermined range associated with the telecommunications protocol.

9. The signal detector of claim 1, wherein the xDSL signal comprises a very high bitrate DSL (VDSL) signal.

10. The signal detector of claim 1, wherein the detector measures signals associated with a consumer premises equipment (CPE) device.

11. A signal detector to selectively measure a plurality of telecommunications signals and to selectively measure the strength and the BER/noise ratio of a selected signal, the signal detector comprising:
    a housing holding electronics to measure a signal associated with a telecommunications protocol and to determine whether the measured signal is within a predetermined range associated with the telecommunications protocol, wherein the signal comprises one of a multimedia over coax (MoCa) signal, an analog radio frequency (RF) signal, a home phoneline networking alliance (HPNA) signal, a digital subscriber line xDSL signal, an Ethernet signal, and a WiFi signal;
    a power source to power the electronics;
    a plurality of ports on the housing to connect to the signal detector a media coupled to a signal source, wherein the signal source further comprises coax, Ethernet, telephone and Wi-Fi;
    a source selector connected to the detector to select a signal for measurement from the signal source;
    a mode selector connected to the detector to select one of a signal strength detection mode and a bit error rate to noise ratio (BER/noise ratio) detection mode; and
    an indicator mounted on the housing to indicate whether the measured signal of the selected signal from the signal source is within the predetermined range associated with the telecommunications protocol.

12. The signal detector of claim 11, wherein the indicator comprises a numeric display to display a numeric value corresponding to a strength of the measured signal.

13. The signal detector of claim 11, wherein the indicator comprises a light emitting diode (LED) that illuminates when a measured signal is within the predetermined range associated with the telecommunications protocol.

14. The signal detector of claim 11, wherein the indicator comprises both a numeric display to display a numeric value corresponding to a strength of a detected signal and an LED that indicates when the measured signal is within the predetermined range associated with the telecommunications protocol.

15. The signal detector of claim 11, wherein the xDSL signal comprises a very high bitrate DSL (VDSL) signal.

16. The signal detector of claim 11, wherein the detector measures signals associated with a consumer premises equipment (CPE) device.

17. A method of measuring a telecommunications signal, the method comprising:
    receiving a signal associated with a telecommunications protocol, wherein the signal comprises one of a multimedia over coax (MoCa) signal, an analog radio frequency (RF) signal, a home phoneline networking alliance (HPNA) signal, a digital subscriber line (xDSL) signal, an Ethernet signal, and a WiFi signal;

measuring a strength of the signal;

determining whether the measured signal strength is within a predetermined range associated with the telecommunications protocol; and indicating when the measured signal strength is within the predetermined range associated with the telecommunications protocol.

18. The method of claim 17, further comprising indicating when the measured signal strength is not within the predetermined range associated with the telecommunications protocol.

19. The method of claim 17, wherein a light emitting diode is used to indicate that the measured signal strength is not within the predetermined range.

20. The method of claim 17, wherein the signal is received from a customer premises equipment (CPE) device.

* * * * *